United States Patent
Hafuka

(10) Patent No.: US 10,333,583 B2
(45) Date of Patent: Jun. 25, 2019

(54) SIGNAL DETECTION CIRCUIT AND SIGNAL DETECTION METHOD

(71) Applicant: LAPIS Semiconductor Co., Ltd., Yokohama (JP)

(72) Inventor: Takamitsu Hafuka, Yokohama (JP)

(73) Assignee: LAPIS Semiconductor Co., Ltd., Yokohama (JP)

( * ) Notice: Subject to any disclaimer, the term of this patent is extended or adjusted under 35 U.S.C. 154(b) by 0 days.

(21) Appl. No.: 15/881,692

(22) Filed: Jan. 26, 2018

(65) Prior Publication Data

US 2018/0219575 A1 Aug. 2, 2018

(30) Foreign Application Priority Data

Jan. 27, 2017 (JP) .................................. 2017-13420

(51) Int. Cl.
*H04L 25/06* (2006.01)
*H04B 1/7073* (2011.01)
*H04B 1/709* (2011.01)

(52) U.S. Cl.
CPC ........... *H04B 1/7073* (2013.01); *H04B 1/709* (2013.01); *H04L 25/061* (2013.01)

(58) Field of Classification Search
USPC .................. 375/150, 147, 148, 239, 343
See application file for complete search history.

(56) References Cited

U.S. PATENT DOCUMENTS

| 5,822,364 A * | 10/1998 | Yamada | H04B 1/7085 375/147 |
| 2002/0181561 A1* | 12/2002 | Sano | H04B 1/712 375/148 |
| 2006/0126766 A1* | 6/2006 | Kang | G06F 17/15 375/343 |
| 2009/0316773 A1* | 12/2009 | Cideciyan | G11B 5/584 375/239 |
| 2017/0257245 A1* | 9/2017 | Shinagawa | H04B 1/7073 |

FOREIGN PATENT DOCUMENTS

JP H09-093160 A 4/1997

* cited by examiner

*Primary Examiner* — Eva Y Puente
(74) *Attorney, Agent, or Firm* — Rabin & Berdo, P.C.

(57) ABSTRACT

A signal detection circuit includes: a correlation circuit including the first through nth correlators connected sequentially as the first through nth stage correlators and each computing a correlation value between a received signal and a spreading sequence while shifting the received signal to the next stage depending on the chip rate period of the spreading sequence; a first adder that adds k correlation values computed by k correlators so as to generate a first addition value; a second adder that adds r correlation values computed by r correlators so as to generate a second addition value; a subtractor that subtracts the first addition value from the second addition value so as to generate a subtraction value; and a synchronization detection unit that compares the subtraction value with a threshold value, so as to detect the synchronization timing of the spreading sequence and the received signal.

14 Claims, 9 Drawing Sheets

SIGNAL DETECTION CIRCUIT AND SIGNAL DETECTION METHOD

BACKGROUND OF THE INVENTION

1. Field of the Invention

The present invention relates to a signal detection circuit and a signal detection method for a spectrum spreading receiver.

2. Description of the Related Art

Recent years have seen spectrum spreading communications in which the frequency spectrum of a signal is spread to a wider band for transmission. In one of spectrum spreading communication schemes or a direct spreading scheme, the transmitter spreads the frequency band of a signal for transmission by a spreading process using a spreading code (spreading sequence). The receiver decodes a received signal by performing a despreading process using the spreading sequence, thereby acquiring the reception data.

The spectrum spreading receiver has a despreading circuit configured to perform the despreading process, as a signal detection circuit for acquiring the reception data from the received signal. The despreading circuit generates a correlation value between the spreading sequence and the received signal, and performs a synchronization detection of the spreading sequence depending on whether the correlation value is equal to or greater than a threshold value. In order to prevent the loss of synchronization due to an obstacle or the like, a wireless data transmission device which is capable of switching the threshold of the correlation value between before and after the synchronization detection is suggested as the spectrum spreading receiver employing the direct spreading scheme (for example, Japanese Patent Application Laid-Open No. Hei. 9-093160).

The despreading circuit (signal detection circuit) as mentioned above has a plurality of correlators which shift a received signal to the next stage for each chip clock, and performs the synchronization detection on the basis of whether the result of addition acquired by adding correlation values calculated by each correlator is equal to or greater than the threshold value. At this time, the higher the signal level of the received signal, the greater the correlation value becomes. However, in an environment with a CNR (Carrier-Noise Ratio) of a low signal level as in the vicinity of a reception sensitivity point, the correlation value becomes lower by being subjected to the influence of noise.

Thus, at a high signal level, the correlation value exceeds the threshold value at an early timing after the signal is received, whereas at a low signal level, the correlation value exceeds the threshold value at a delayed timing. When the correlation value exceeds the threshold value at a delayed timing, the synchronization detection is also performed at a delayed timing, and thus the reception data and the reception clock are also generated at a delayed timing. Furthermore, in a wireless communication system with a short preamble length, the synchronization detection performed at a delayed timing may possibly achieve no synchronization before a synchronization word. This in turn would lead to a situation in which the reception data and the reception clock were not successfully generated, and thus packets could not be received.

The present invention has been made in view of the aforementioned problem. It is therefore an object of the present invention to provide a signal detection circuit which is capable of performing a synchronization detection with reliability irrespective of the reception signal level in a spectrum spreading communication receiver.

SUMMARY OF THE INVENTION

According to one aspect of the present invention, a signal detection circuit which receives a signal transmitted by spectrum spreading communications using a spreading sequence and acquires reception data from the resulting received signal on the basis of the spreading sequence. The signal detection circuit includes: a correlation circuit including the first through nth correlators (n is an integer equal to three or greater) connected sequentially as the first through nth stage correlators, the first through nth correlators each being configured to compute a correlation value between the received signal and the spreading sequence while shifting the received signal to the next stage depending on a chip rate period of the spreading sequence; a first adder configured to add k number of correlation values which have been computed by respective ones of k number of correlators (k is an integer such that $1<k\leq j$ where j is an integer such that $1<j<n-2$) including the jth correlator among the first through jth correlators of the correlation circuit, so as to generate a first additional value; a second adder configured to add r number of correlation values which have been computed by respective ones of r number of correlators (r is an integer such that $k<r\leq p$ where p is an integer such that $j<p\leq n$) including the pth correlator among the first through pth correlators of the correlation circuit, so as to generate a second addition value; a subtractor configured to subtract the first addition value from the second addition value so as to generate a subtraction value; and a synchronization detection unit configured to compare the subtraction value with a threshold value, so as to detect a synchronization timing of the spreading sequence and the received signal according to the comparison result.

According to another aspect of the present invention, a signal detection method for a signal detection circuit includes receiving a signal transmitted by spectrum spreading communications using a spreading sequence and acquiring reception data from the resulting received signal on the basis of the spreading sequence. The signal detection method includes the steps of: computing, as the first through nth correlation values (n is an integer equal to three or greater), a correlation value between the spreading sequence and the received signal for n bits shifted according to a chip rate period of the spreading sequence; adding correlation values for k bits (k is an integer such that $1<k\leq j$ where j is an integer such that $1<j<n-2$) including the jth correlation value among the first through jth correlation values, so as to generate a first addition value; adding correlation values for r bits (r is an integer such that $k<r\leq p$ where p is an integer such that $j<p\leq n$) including the pth correlation value among the first through pth correlation values, so as to generate a second addition value; subtracting the first addition value from the second addition value so as to generate a subtraction value; and comparing the subtraction value with a threshold value, so as to detect a synchronization timing of the spreading sequence and the received signal according to the comparison result.

The signal detection circuit according to the present invention makes it possible to perform a synchronization detection with reliability irrespective of the level of a received signal in a spectrum spreading communication receiver.

BRIEF DESCRIPTION OF THE DRAWINGS

The features of the present invention will be described in the following description with reference to the accompanying drawings, in which.

DETAILED DESCRIPTION OF THE INVENTION

Figure 1:
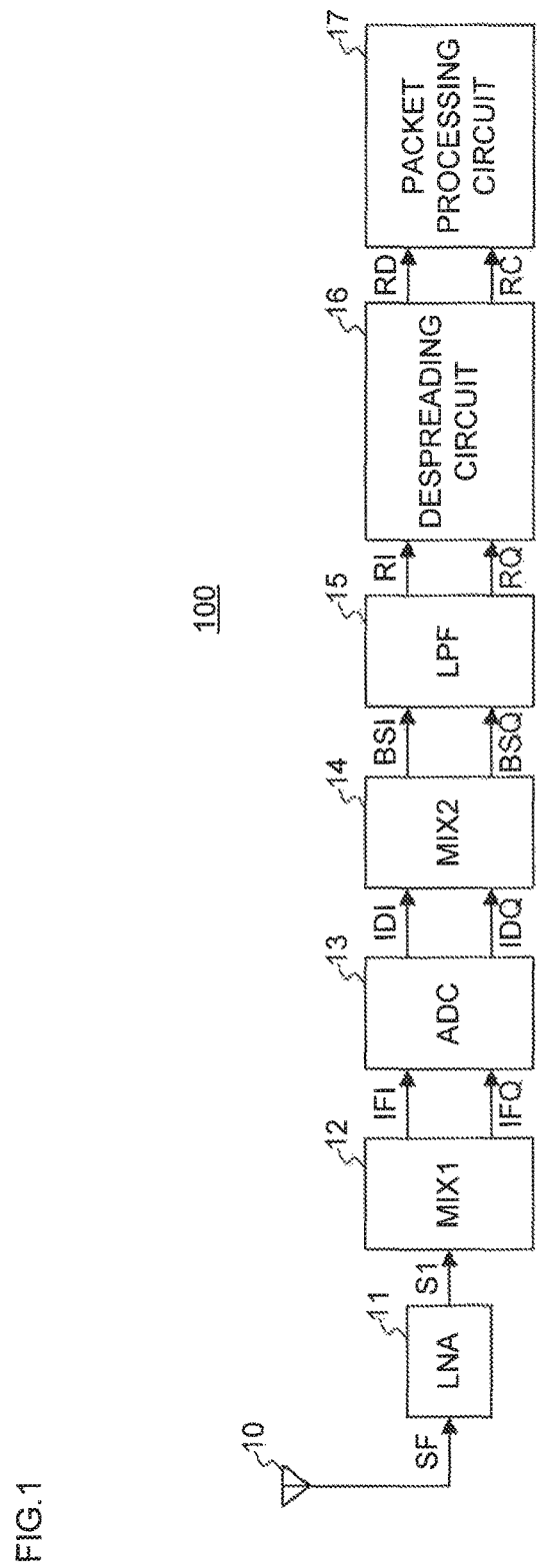
FIG. 1 is a block diagram illustrating a configuration of a spectrum spreading receiver according to an embodiment.

A description will be given of embodiments of the present invention with reference to the drawings. Note that in the following description and accompanying drawings for the embodiments, substantially the same or equivalent parts are denoted by the same reference numerals/symbols.

FIG. 1 is a block diagram illustrating a configuration of a spectrum spreading receiver 100 according to the present invention. The spectrum spreading receiver 100 receives a spreading frequency signal SF transmitted through spectrum spreading communications by a direct spreading scheme from a transmitter (not illustrated) and then acquires reception data by performing a despreading process on the basis of a spreading sequence (spreading code). For example, the spreading sequence includes a PN (Pseudo random Noise) pattern which is characterized by having a sharp autocorrelation peak and a low cross-correlation. The PN pattern typically includes an M sequence or a Gold sequence. In the following description, such an example will be described in which the spreading frequency signal SF (transmission data) includes a preamble of 16 bits with a spreading rate of 64 (spreading sequences per one data bit).

The spectrum spreading receiver 100 includes an antenna 10, an LNA (Low Noise Amplifier) 11, a first mixer 12 (illustrated as a MIX 1 in the figure), an ADC (Analog to Digital Converter) 13, a second mixer 14 (illustrated as MIX 2 in the figure), an LPF (Low Pass Filter) 15, a despreading circuit 16, and a packet processing circuit 17.

The antenna 10 is a reception antenna for receiving the spreading frequency signal SF transmitted from the transmitter (not illustrated). The spreading frequency signal SF is spread to a wider frequency band by an operation using a spreading sequence and then transmitted.

The LNA 11 is a low-noise amplifier which amplifies, with low-noise, the spreading frequency signal SF received by the antenna 10 and which then outputs the resulting signal to the first mixer 12.

The first mixer 12 mixes the output signal from the LNA 11 with a local oscillation signal from a local oscillator (not illustrated). The first mixer 12 converts the frequency of the spreading frequency signal SF (a signal S1) amplified by the LNA 11 into an IF (intermediate frequency), so as to generate an IF signal IFI of an I phase (In-phase) and an IF signal IFQ of a Q phase (Quadrature) of which phases differ from each other by 90 degrees.

The ADC 13 converts, from analog to digital, the IF signals IFI (I phase) and IFQ (Q phase), of which frequencies have been converted by the first mixer 12, and then supplies the resulting signals to the second mixer 14.

The second mixer 14 converts the IF signals IDI and IDQ, which have been converted to digital by the ADC 13, into baseband signals BSI (I phase) and BSQ (Q phase).

The LPF 15 limits the pass band by a preset interrupting frequency, allowing the lower-frequency components of each of the baseband signals BSI and BSQ to pass therethrough.

The despreading circuit 16 is a signal detection circuit configured to generate reception data from the baseband signals BSI and BSQ, of which bandwidth has been limited by the LPF 15. The despreading circuit 16 performs the despreading process which generates a correlation value between the received signals RI (I phase) and RQ (Q phase), which are the baseband signals after the bandwidth has been limited, and a spreading sequence SC (C1 to C64), and which restores the data transmitted from the transmitter on the basis of the correlation value. The despreading circuit 16 supplies reception data RD and a reception clock RC, which have been acquired by the despreading process, to the packet processing circuit 17. The packet processing circuit 17 performs packet processing, for example, for detection of synchronization words or extraction of user data. Note that in the following description, the received signals RI (I phase) and (Q phase) will be collectively referred to as a received signal RS.

Figure 2:
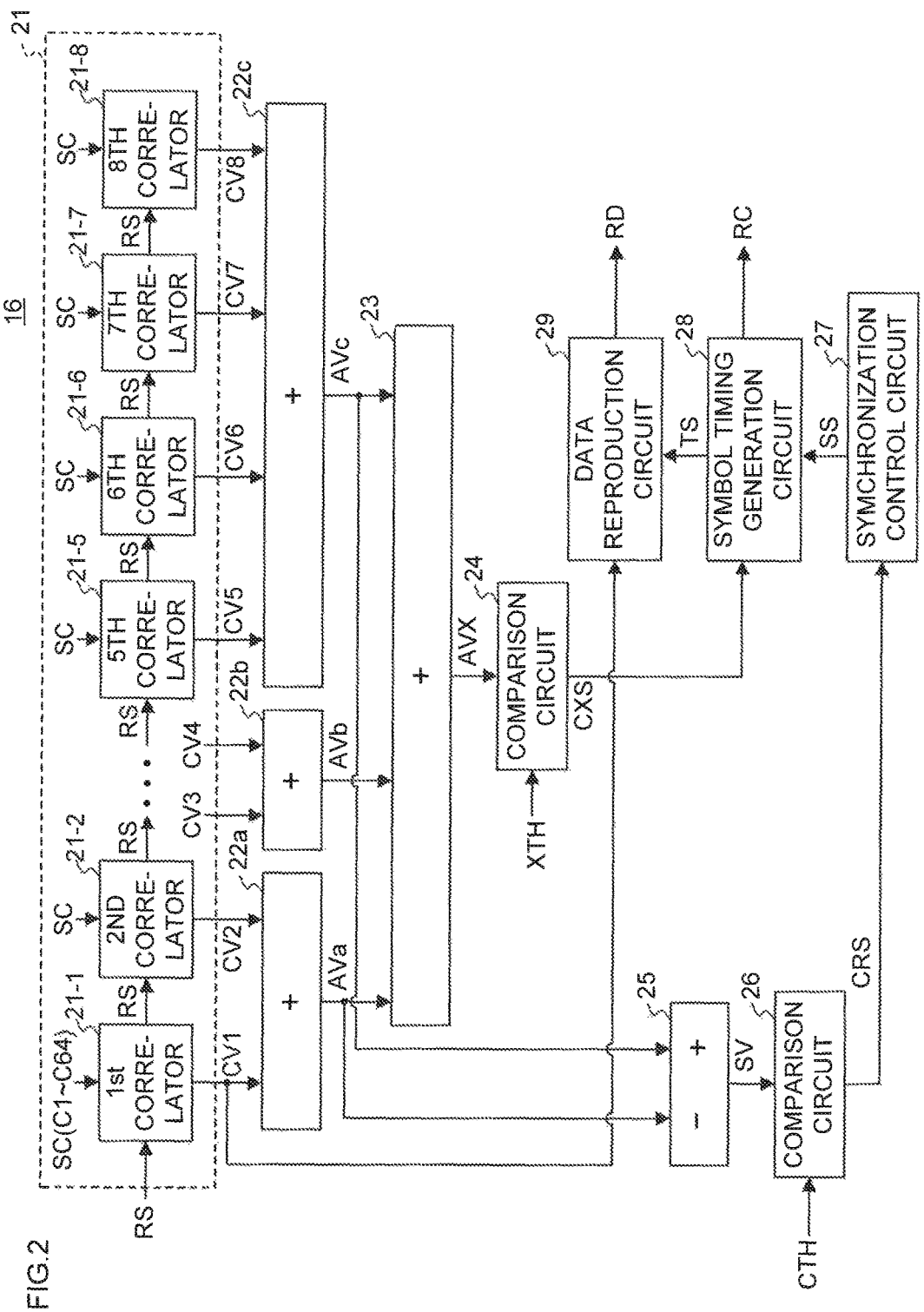
FIG. 2 is a block diagram illustrating a configuration of a despreading circuit according to an embodiment.

FIG. 2 is a block diagram illustrating a configuration of the despreading circuit 16. The despreading circuit 16 includes a correlation circuit 21, adders 22a, 22b, and 22c, a total adder 23, a comparison circuit 24, a subtractor 25, a comparison circuit 26, a synchronization control circuit 27, a symbol timing generation circuit 28, and a data reproduction circuit 29.

The correlation circuit 21 is configured from a first correlator 21-1 to an eighth correlator 21-8 which are serially connected together in that order as the first through eighth stages. Each of the first correlator 21-1 to the eighth correlator 21-8 computes a correlation value between the received signal RS and the spreading sequence SC (C1 to C64). Each correlator computes and then outputs the correlation values CV1 to CV8 between the received signal RS and the spreading sequence SC while sequentially shifting the received signal RS to the next stage (i.e., the correlator disposed adjacently in the subsequent stage) according to the rate of the spreading sequence SC (which is the code rate of the spreading code, and hereinafter will be referred to as the chip rate.) The correlation value is computed for the preamble portion of the received signal RS. That is, the first correlator 21-1 to the eighth correlator 21-8 compute the correlation values for 8 bits of the 16 bits in the preamble.

Figure 3:
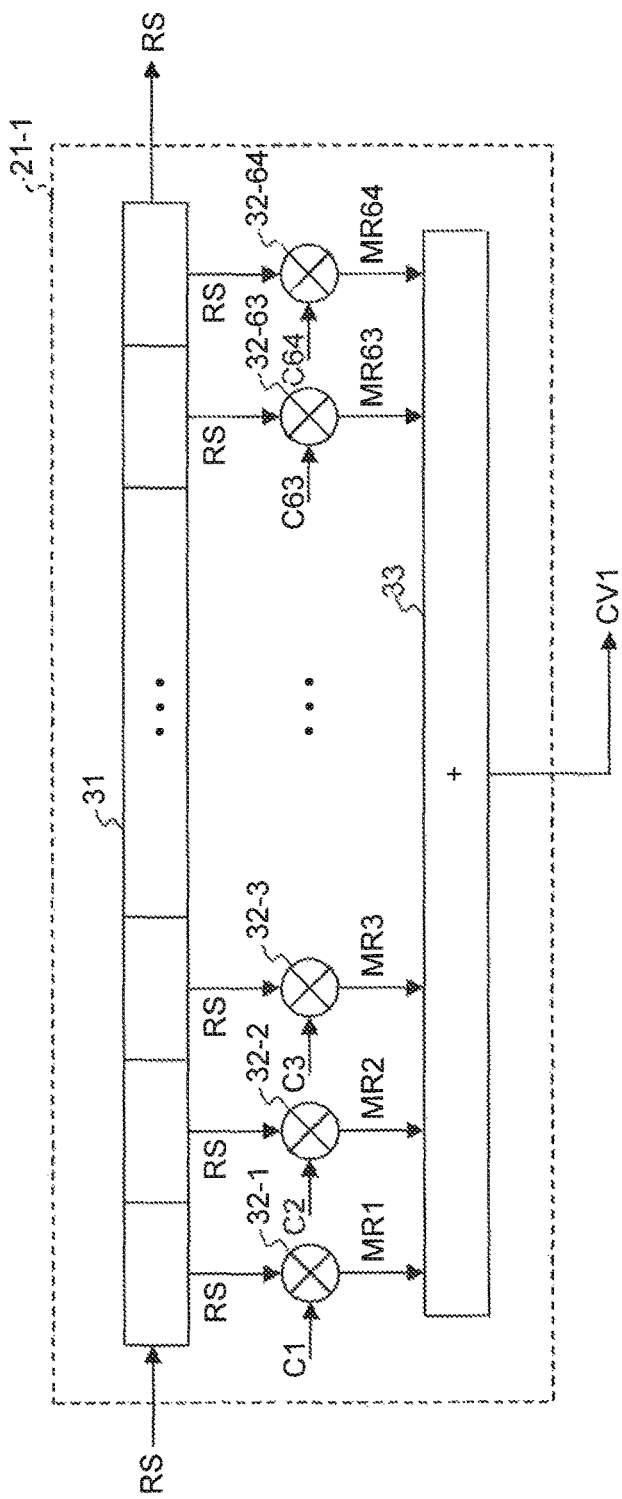
FIG. 3 is a block diagram illustrating a configuration of a correlator according to an embodiment.

FIG. 3 is a block diagram illustrating the first correlator 21-1 as an example the configuration of each correlator. The first correlator 21-1 is configured from a plurality of stages of shift registers 31, multipliers 31-1 to 32-64, and an adder 33. Each stage of the shift registers 31 shifts the received signal RS or input data in a chip rate period. The multipliers 32-1 to 32-64 multiply the output from each stage of the shift registers 31 by one bit of spreading sequences C1 to C64. The adder 33 adds together the multiplication results MR1 to MR64 from each multiplier. The first correlator 21-1 outputs the addition result from the adder 33 as the correlation value CV1. The second correlator 21-2 to the eighth correlator 21-8 also have the same configuration.

Referring back to FIG. 2, the first correlator 21-1 supplies the computed correlation value CV1 to the adder 22a and the data reproduction circuit 29. The second correlator 21-2 supplies the computed correlation value CV2 to the adder 22a. The third correlator 21-3 and the fourth correlator 21-4 supply the computed correlation values CV3 and CV4 to the adder 22b. The fifth correlator 21-5 to the eighth correlator 21-8 supply the computed correlation values CV5 to CV8 to the adder 22c.

The adder 22a acquires an addition value AVa by adding the correlation value CV1 and the correlation value CV2 computed by the successive correlators or the first correlator 21-1 and the second correlator 21-2. The adder 22a supplies the addition value AVa to the total adder 23 and the subtractor 25.

The adder 22b adds together the correlation value CV3 and the correlation value CV4 computed by the third correlator 21-3 and the fourth correlator 21-4, and then supplies the resulting addition value AVb to the total adder 23.

The adder 22c acquires an addition value AVc by adding together the correlation values CV5, CV6, CV7, and CV8 computed by the successive correlators or the fifth correlator 21-5 to the eighth correlator 21-8. The adder 22c supplies the resulting addition value AVc to the total adder 23 and the subtractor 25.

The total adder 23 acquires a total addition value AVX by further adding together the addition values AVa, AVb, and AVc.

The comparison circuit 24 compares the total addition value AVX with a threshold value XTH, so as to generate a comparison result signal CXS indicative of the comparison result and supply the comparison result signal CXS to the symbol timing generation circuit 28.

The subtractor 25 performs the subtraction processing for subtracting the addition value AVa computed by the adder 22a from the addition value AVc computed by the adder 22c. The subtractor 25 supplies, to the comparison circuit 26, a subtraction value SV that is the computation result of the subtraction processing.

The comparison circuit 26 compares the subtraction value SV with a threshold value CTH, and then supplies, to the synchronization control circuit 27, a comparison result signal CRS indicative of the comparison result (for example, a signal having different signal levels for the cases where the subtraction value SV is equal to or greater than the threshold value CTH and where the subtraction value SV is less than the threshold value CTH.)

The synchronization control circuit 27 determines on the basis of the comparison result signal CRS whether the spreading sequence SC is in a synchronous state. More specifically, the synchronization control circuit 27 determines that the synchronous state is achieved when the comparison circuit 26 has determined that the subtraction value SV is equal to or greater than the threshold value CTH. The synchronization control circuit 27 supplies, to the symbol timing generation circuit 28, a synchronous signal SS having an H level (high level) which indicates that the synchronous state has been achieved.

On the basis of the comparison result signal CXS supplied from the comparison circuit 24 (i.e., the result of comparison between the total addition value AVX and the threshold value XTH) and the synchronous signal SS supplied from the synchronization control circuit 27, the symbol timing generation circuit 28 generates a symbol timing signal TS indicative of the symbol timing of the received signal RS and a reception clock signal RC. The symbol timing generation circuit 28 supplies the symbol timing signal TS to the data reproduction circuit 29. The synchronization control circuit 27 and the symbol timing generation circuit 28 each have the function as a synchronization detection unit for detecting the synchronization timing of the spreading sequence SC and the received signal RS.

The data reproduction circuit 29 reproduces (generates) the reception data RD on the basis of the symbol timing signal TS and the correlation value CV1 computed by the first correlator 21-1.

Figure 4:
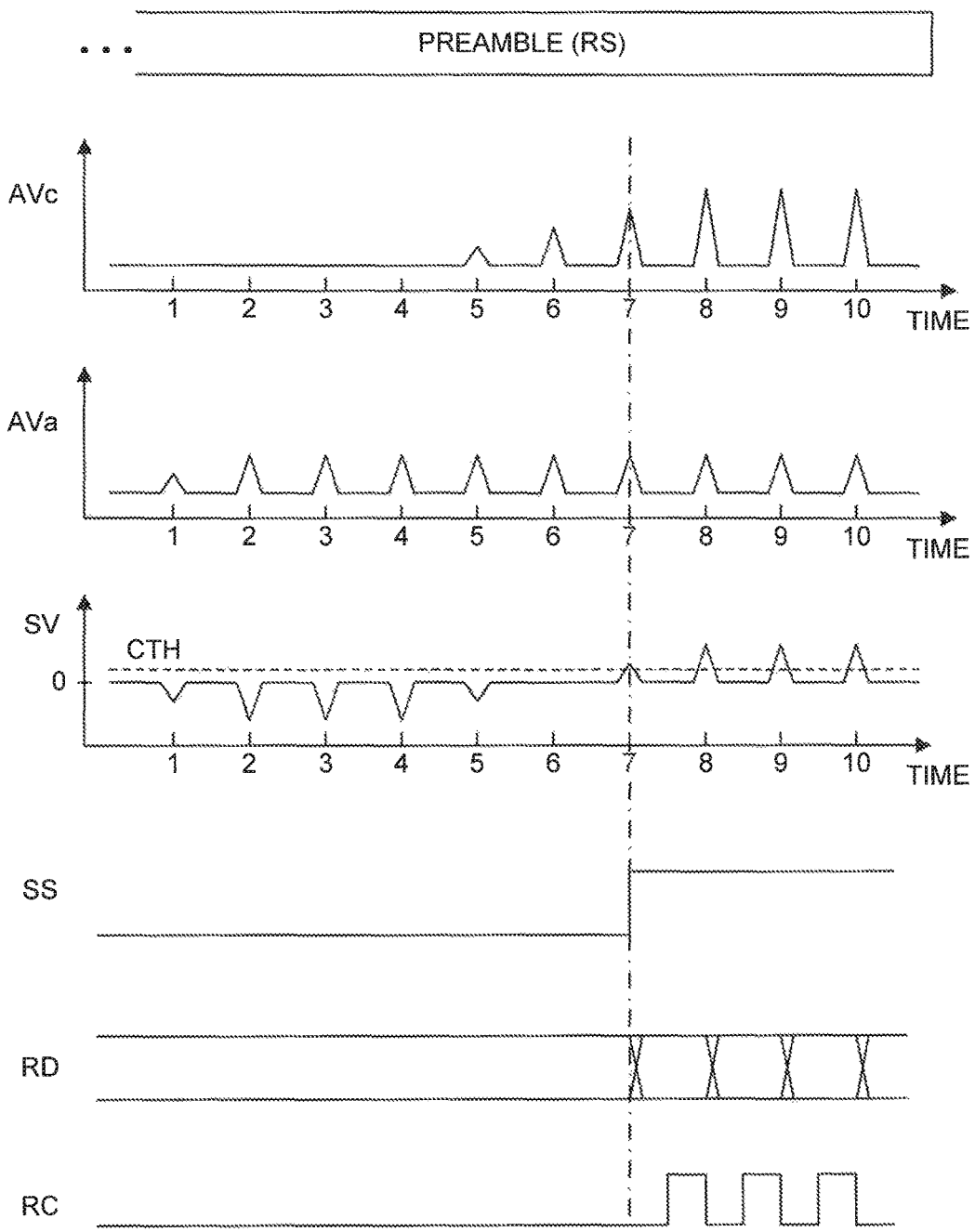
FIG. 4 is a timing chart illustrating a relationship between the output waveform and the synchronization timing of an addition value and a subtraction value in the embodiment.

Now, referring to the timing chart of FIG. 4, a description will be given of the operation of the synchronization control processing by the despreading circuit 16 according to this embodiment. In the figure, the scale of the horizontal axis represents the unit time equivalent to the transition of one bit computed on the basis of the transmission data rate (bit rate).

The addition value AVc is the addition result of the correlation values CV5 to CV8 computed by the fifth correlator 21-5 to the eighth correlator 21-8. Thus, when the received signal RS is input to the correlation circuit 21, the addition value AVc takes values increased from the 5th to 8th bit in a stepwise manner with the maximum value at the 8th bit.

The addition value AVa is the addition value of the correlation values CV1 and CV2 computed by the first correlator 21-1 and the second correlator 21-2. Thus, when the received signal RS is input, the addition value AVa takes the maximum value at the 2nd bit.

The subtraction value SV is the subtraction result acquired by subtracting the addition value AVa from the addition value AVc. Thus, the subtraction value SV takes ±0 at the 6th bit, a plus value for one correlator at the 7th bit, and a plus value for two correlators at the 8th bit onward.

Thus, when the threshold value CTH is set to be less than a plus value for two correlators, the subtraction value SV is to exceed the threshold value CTH at the 7th bit or the 8th bit. For example, when the subtraction value SV exceeds the threshold value CTH at the 7th bit, the synchronous signal SS at the H level is generated at the timing of the 7th bit, and the generation of the reception data RD and the reception clock signal RC is started.

As described above, the despreading circuit 16 according to this embodiment has the subtractor 25 that subtracts the addition value AVa (the first addition value) of upper 2 bits from the addition value AVc (the second addition value) of lower 4 bits. Then, the despreading circuit 16 allows the comparison circuit 26 to compare the subtraction value SV with the threshold value CTH, thereby performing a synchronization detection. According to this arrangement, since the synchronization detection is performed on the basis of the value acquired by relatively comparing the addition value AVc of the lower 4 bits with the addition value AVa of the upper 2 bits, the synchronization detection can be performed at an early stage with reliability even if the received signal RS has a low level and the correlation value has a small absolute value.

Figure 5:
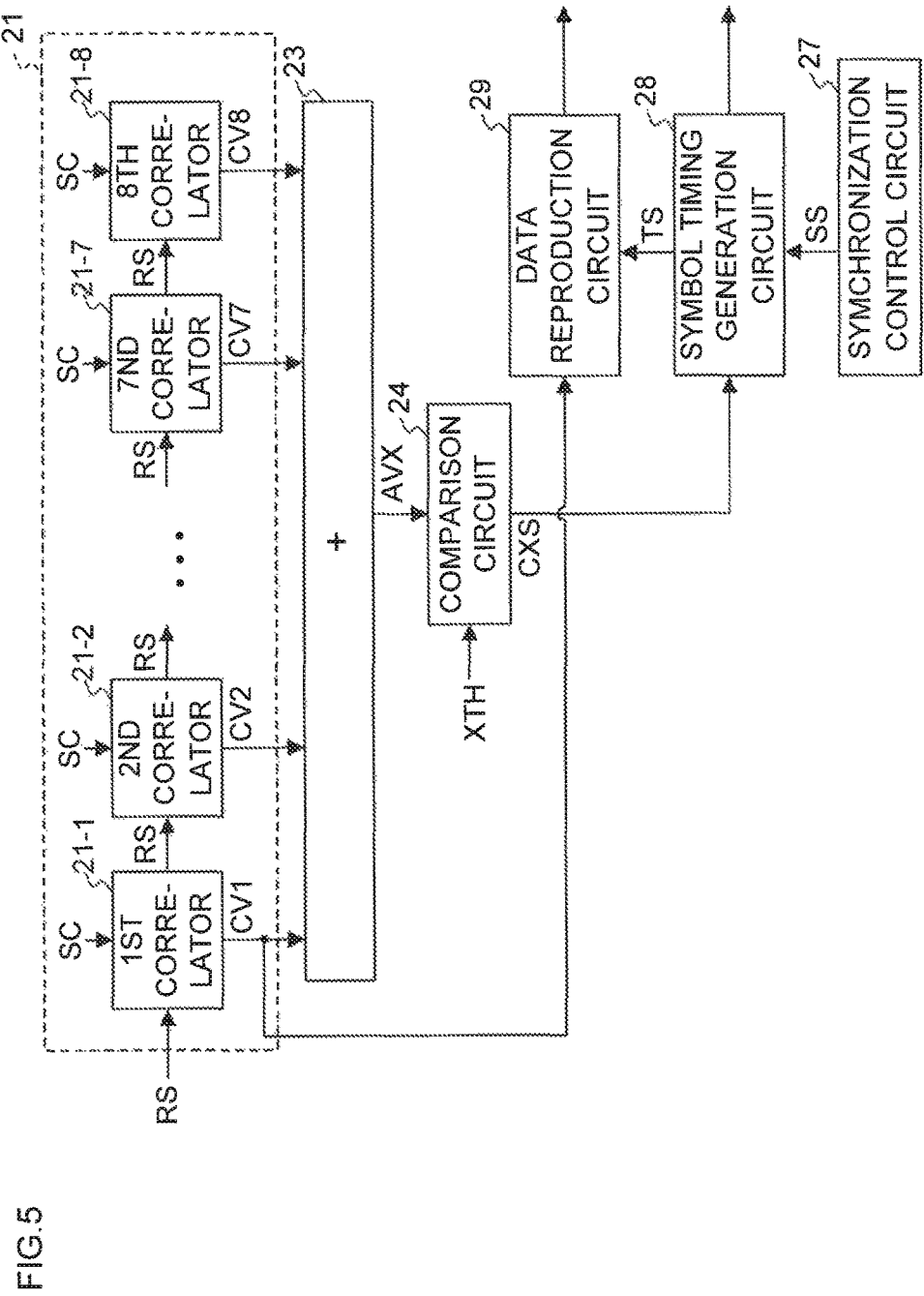
FIG. 5 is a block diagram illustrating, as a comparative example, a configuration of a despreading circuit having no subtractor and comparison circuit for a subtraction value unlike the embodiment.

FIG. 5 is a block diagram illustrating, as a comparative example, for comparison with the despreading circuit according to this embodiment, the configuration of a despreading circuit that is not provided with the subtractor 25 and the comparison circuit 26.

The comparison circuit 24 compares the threshold value XTH with the total addition value AVX acquired by adding the correlation values CV1 to CV8 computed by the first through eighth correlators, and generates the comparison result signal CXS indicative of the comparison result and supplies the comparison result signal CXS to the synchronization control circuit 27. The synchronization control circuit 27 performs the synchronization detection on the basis of the comparison result between the total addition value AVX and the threshold value XTH.

Figure 6A:
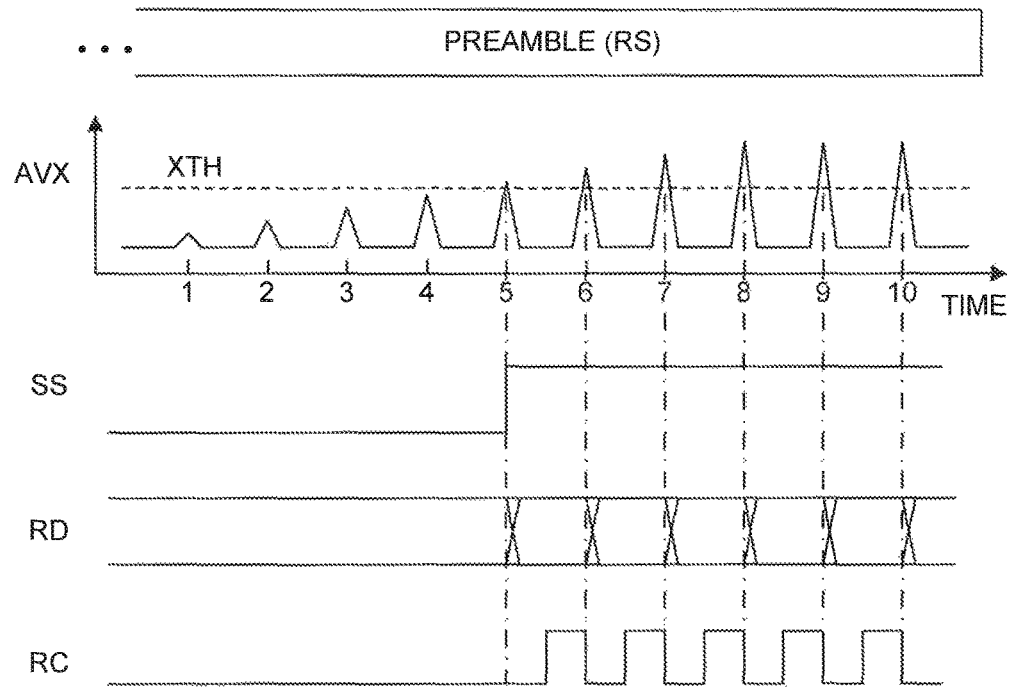
FIG. 6A is a timing chart illustrating a relationship between the output waveform of an addition value and a synchronization timing in the despreading circuit of the comparative example when the received signal has a high signal level.
Figure 6B:
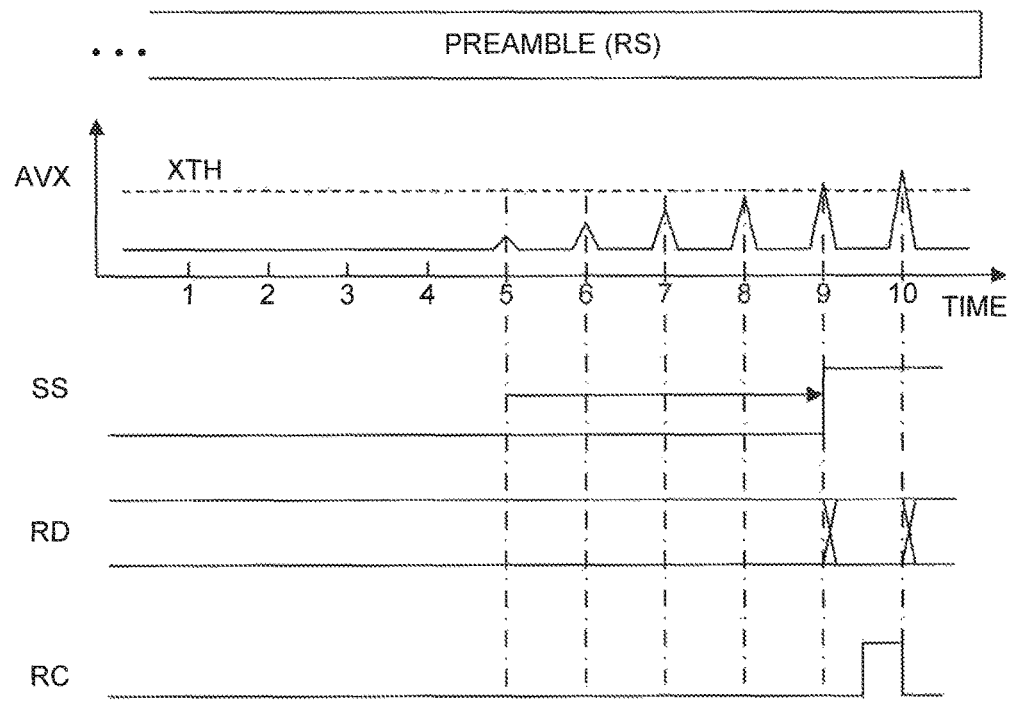
FIG. 6B is a timing chart illustrating a relationship between the output waveform of an addition value and a synchronization timing in the despreading circuit of the comparative example when the received signal has a low signal level.

Since the despreading circuit of the comparative example performs the synchronization detection on the basis of the total addition value AVX, the synchronization detection is performed at different timing depending on the magnitude of the signal level of the received signal RS. FIGS. 6A and 6B are timing charts indicative of the relationship between the output waveform of the addition value and the synchronization timing for the respective cases where the received signal RS has a high signal level (FIG. 6A) and a low signal level (FIG. 6B).

The correlation value computed by each correlator varies depending on the signal level of the received signal RS. Thus, the total addition value AVX takes on a large value for a high signal level of the received signal RS, whereas the total addition value AVX takes on a small value for a low signal level of the received signal RS.

Thus, for a high signal level of the received signal RS, the synchronization detection is performed with the total addition value AVX exceeding the threshold value XTH at the 5th bit as shown in FIG. 6A, and the synchronous signal SS of the H level, the reception data RD, and the reception clock signal RC are generated. However, for a low signal level of the received signal RS, since the total addition value AVX exceeds the threshold value XTH at the 9th bit for the first time as shown in FIG. 6B, the timing of the synchronization detection is delayed, thus delaying the start of generation of the reception data RD and the reception clock signal RC. For a further lower signal level of the received signal RS, such a case may possibly occur in which the synchronization detection cannot be performed within the preamble.

In contrast to this, in the despreading circuit 16 according to this embodiment, the addition value AVc of the lower 4 bits in the correlation circuit 21 is compared in magnitude with the addition value AVa of the upper 2 bits, thereby ensuring that the addition value AVc of the lower 4 bits is greater when the signal is shifted up to the eighth correlator 21-8. Thus, even if the received signal RS has a low level, it is possible to detect the reception of a desired signal. Furthermore, due to the relative comparison between the addition value AVc of the lower 4 bits and the addition value AVa of the upper 2 bits, the addition value AVc of the lower 4 bits always becomes greater at a certain constant timing even if the received signal RS has a low level and the correlation value has a low absolute value. For example, when the correlation values of the lower 4 bits and the upper 2 bits are compared with each other as in this embodiment, a timing gap is within one bit. Thus, it is possible to perform the signal detection (synchronization detection) at a certain constant timing with reliability.

Note that the present invention is not limited to the aforementioned implementation example. For example, in the aforementioned embodiment, the addition result of the correlation values CV1 and CV2 of the first correlator 21-1 and the second correlator 21-2 was employed as the addition value AVa (the first addition value), and the addition result of the correlation values CV5 to CV8 of the fifth correlator 21-5 to the eighth correlator 21-8 was employed as the addition value AVc (the second addition value), so that the addition value AVa was subtracted from the addition value AVc to thereby compute the subtraction value SV. However, the method for selecting the correlation values to be added as the addition values AVa and AVc is not limited thereto.

Figure 7:
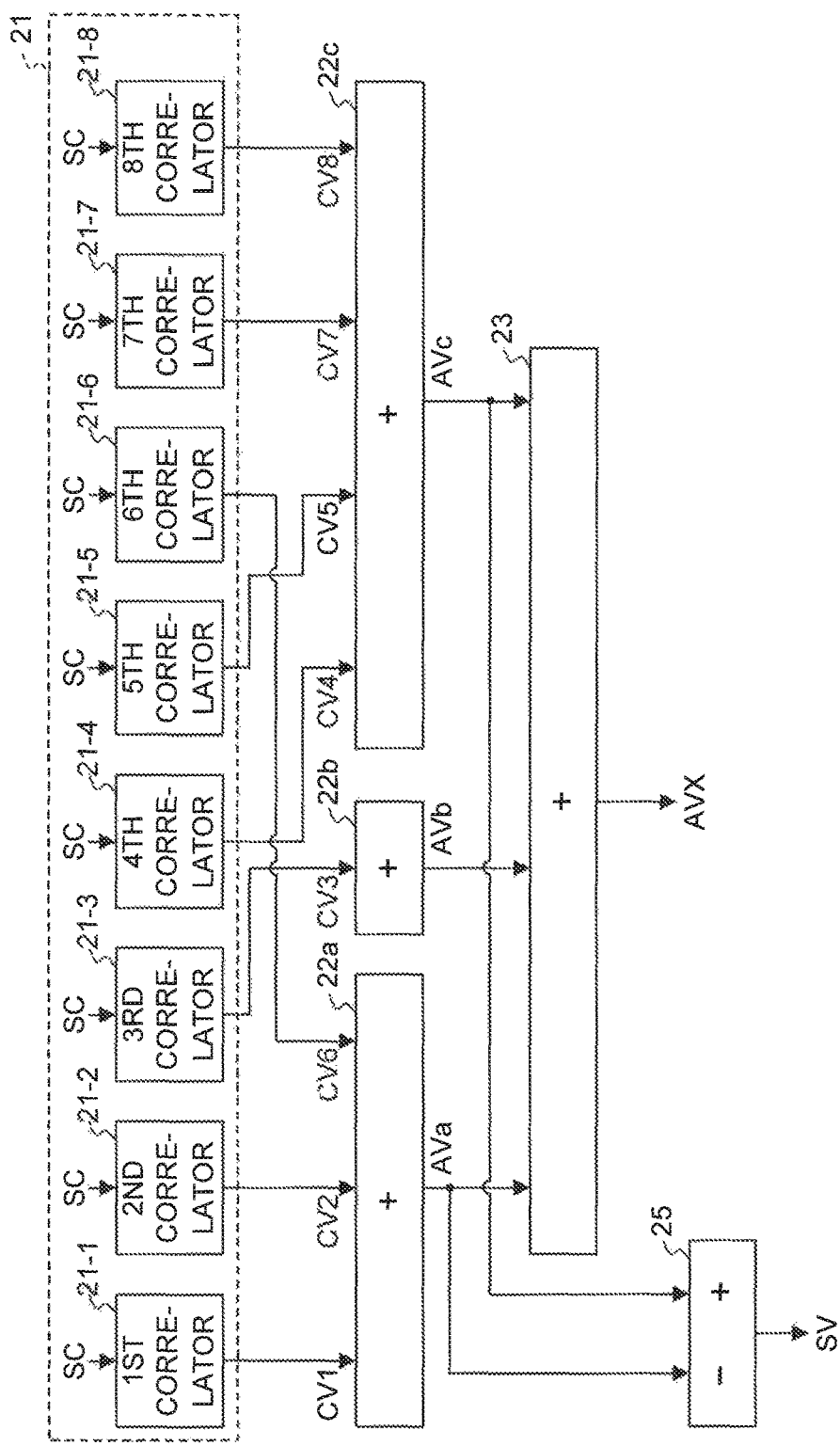
FIG. 7 is a block diagram illustrating a modified example of the despreading circuit.

For example, in the aforementioned embodiment, as shown in FIG. 2, the adder 22a computed the addition result of two correlation values as an addition value, while the adder 22c computed the addition result of four correlation values as an addition value. However, the number of correlation values to be added by the adders 22a and 22c is not limited thereto. For example, as shown in FIG. 7, the adder 22a may also add three correlation values and the adder 22c may add four correlation values. That is, the number of correlation values to be added by the adder 22c only has to exceed the number of correlation values to be added by the adder 22a. Note that as in the aforementioned embodiment, the number of correlation values to be added by the adder 22c exceeds, by two or more, the number of correlation values to be added by the adder 22a, thereby allowing the timing gap of a synchronization detection to lie within one bit.

Furthermore, the correlation values to be added by each of the adders 22a and 22c do not have to be computed by successive correlators, but may also be computed by non-successive correlators. Furthermore, the positional relation of correlators is not limited to that illustrated in the aforementioned embodiment. The last one of the correlators computing the correlation values to be added by the adder 22c may only have to be located after the last one of the correlators computing the correlation values to be added by the adder 22a. It is also acceptable that the last one of the correlators computing the correlation values to be added by the adder 22a may be located after the top one of the correlators computing the correlation values to be added by the adder 22c. For example, as shown in FIG. 7, the adder 22a may compute the addition value AVa by adding together the correlation values CV1, CV2, and CV6, while the adder 22c may also compute the addition value AVc by adding the correlation values CV4, CV5, CV7 and CV8.

Furthermore, in the aforementioned embodiment, such an example was described in which the correlation circuit 21 is configured from correlators for 8 bits from the first correlator 21-1 to the eighth correlator 21-8. However, the number of correlators is not limited thereto. Furthermore, the correlation values to be added by the adder 22a may not always include a correlation value computed by the top correlator. The correlation values to be added by the adder 22c may not always include a correlation value computed by the last correlator.

Figure 8:
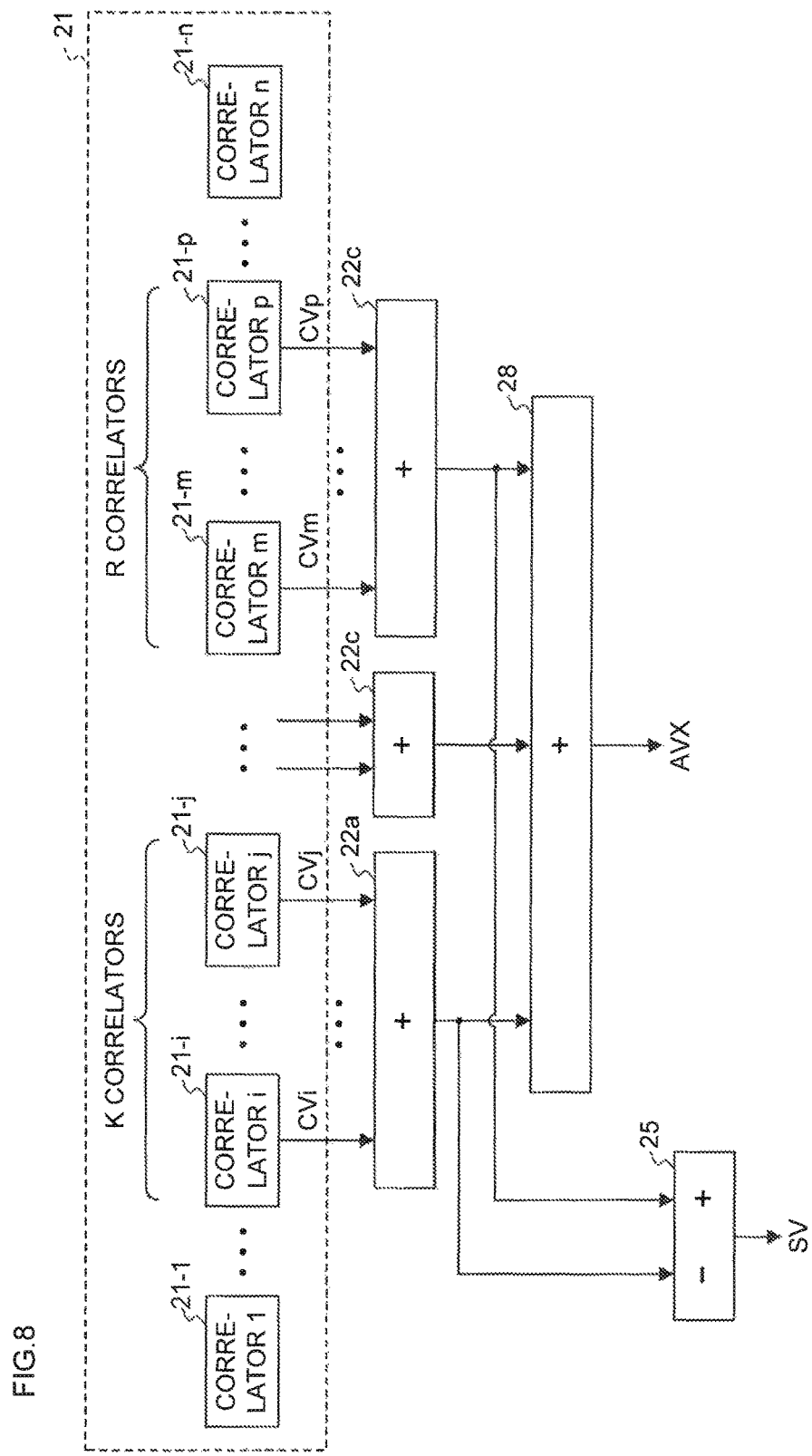
FIG. 8 is a block diagram illustrating a modified example of the despreading circuit.

For example, as shown in FIG. 8, when the number of correlators included in the correlation circuit 21 is n (n is an integer equal to 3 or greater), the adder 22a as the first adder may only have to compute the first addition value AVa by adding k correlation values computed by k correlators (k is an integer such that $1<k\le j$ where j is an integer such that 1<j≤n−2) including the jth correlator among the first through jth correlators of the correlation circuit 21. The adder 22c as the second adder may only have to compute the second addition value AVc by adding r correlation values computed by r correlators (r is an integer such that k<r≤p where p is an integer such that j<p≤n) including the pth correlator among the first through pth correlators of the correlation circuit.

At this time, successively connected correlators can be selected as the k correlators and the r correlators, and at least one correlator which belongs to neither group is provided therebetween, thereby performing a synchronization detection with reliability in a further simplified arrangement.

Furthermore, the number of correlation values to be added by the adder 22a is defined as 2 s, and the number of correlation values to be added by the adder 22c is defined as 2 t (where s and t are a natural number such that s<t), thereby providing an arrangement that is appropriately adapted by a preamble of even number bits.

Note that considering that a synchronization detection is performed in an efficient manner, it is most preferable to employ the despreading circuit as illustrated in FIG. 2 in the aforementioned embodiment. As the correlators for outputting correlation values on which the addition values AVa and AVc to be subtracted by the subtractor rely, selected are the 2 s correlators from the top (in FIG. 2, the first correlator 21-1 and the second correlator 21-2) and 2 t correlators from the last (the fifth correlator 21-5 to the eighth correlator 21-8). Then, the correlators (the third correlator 21-3 and the fourth correlator 21-4) employed for computation of the total addition value AVX but not for subtraction can be provided therebetween, thereby enabling an efficient synchronization detection.

Furthermore, the despreading circuit according to the aforementioned embodiment (FIG. 2) computes the total addition value AVX by the so-called tournament type addition; that is, the adder 22a adds together the correlation values of the first correlator 21-1 and the second correlator 21-2, the adder 22b adds together the correlation values of the third correlator 21-3 and the fourth correlator 21-4, and the adder 22c adds together the correlation values of the fifth correlator 21-5 and the eighth correlator 21-8, and then the total adder 23 further adds together these values. Thus, like the despreading circuit 16 of FIG. 2, the subtractor 25 performs a subtraction using the tournament type half-way addition results AVa and AVc, thereby achieving the present invention in a simplified circuit configuration.

Figure 9:
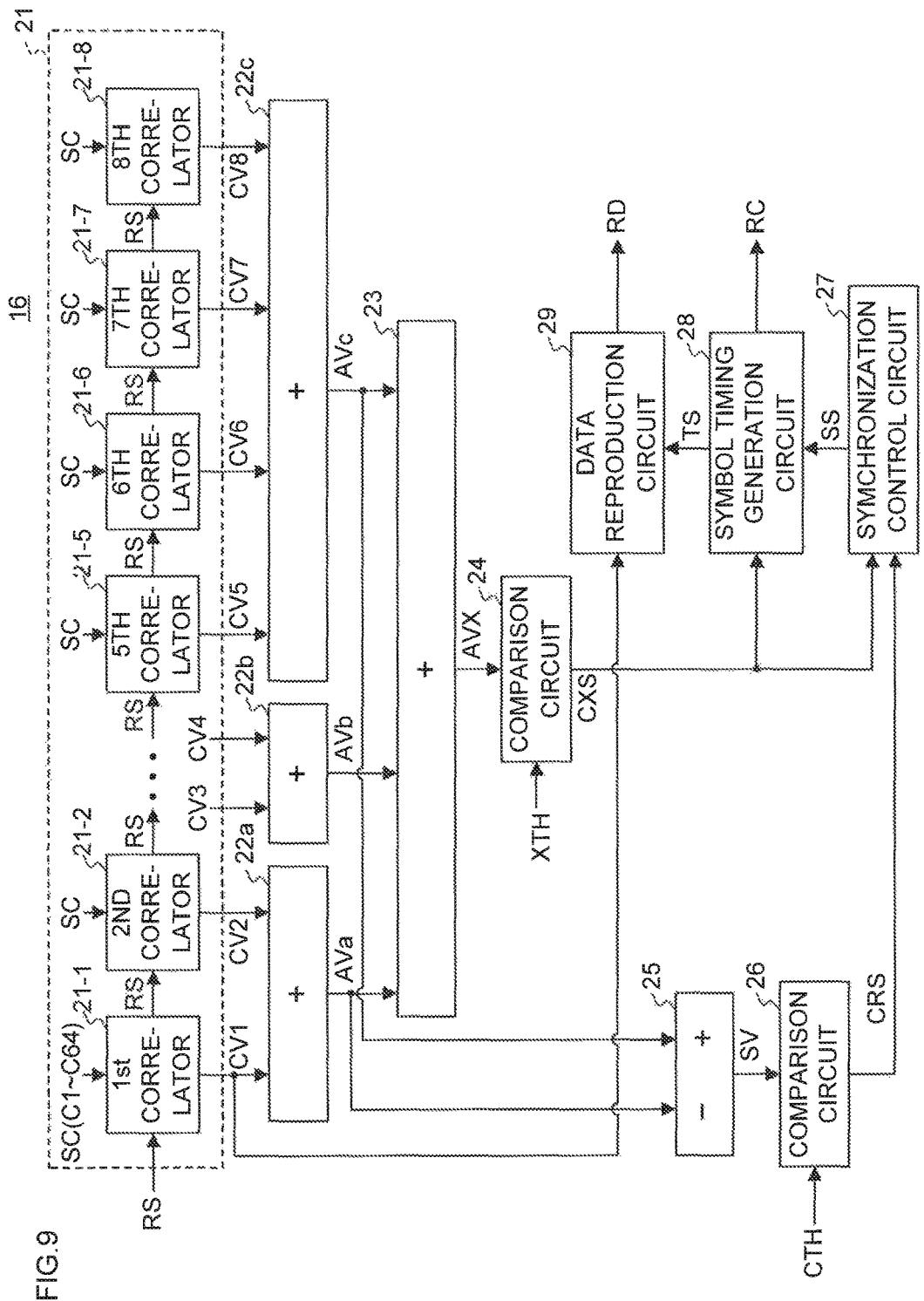
FIG. 9 is a block diagram illustrating a modified example of the despreading circuit.

Furthermore, as shown in FIG. 9, it is also acceptable that in addition to the comparison result between the subtraction value SV and the threshold value CTH (the comparison result signal CRS), the result of comparison between the total addition value AVX and the threshold value XTH (the comparison result signal CXS) may also be used to perform a synchronization detection of the spreading sequence SC. For example, it is possible to prevent erroneous determinations by determining that a synchronous state is achieved when the subtraction value SV takes on the threshold value CTH or greater, and the total addition value AVX takes on the threshold value XTH or greater.

Furthermore, in the aforementioned embodiment, such an example was described in which the spreading rate (the spreading sequence per one bit) was 64. However, the value of the spreading rate is not limited thereto. Each correlator can be configured depending on the spreading rate.

This application is based upon and claims the benefit of priority from the prior Japanese Patent Application No. 2017-013420 filed on Jan. 27, 2017, the entire contents of which are incorporated herein by reference.

What is claimed is:

1. A signal detection circuit for receiving a signal including data and a spreading sequence, and acquiring said data from the received signal based on the spreading sequence, the signal detection circuit comprising:
    a correlation circuit including first through nth correlators (n is an integer equal to three or greater), each being configured to obtain a correlation value between a reference spreading sequence and the spreading sequence included in the received signal;
    a corrected correlation value generating unit configured to generate a corrected correlation value based on the correlation values obtained by said first through nth correlators,
    a synchronization detection unit configured to generate a synchronization detection signal indicating a timing of synchronization between the reference spreading sequence and the spreading sequence included in the received signal, based on said corrected correlation value,
    wherein said first through nth correlators are connected in series as first through nth stage correlators, each includes a shift resister and obtains the correlation value while shifting said received signal to a next stage depending on a chip rate period of said spreading sequence,
    wherein said corrected correlation value generating unit includes:
    a first adder configured to add k number of correlation values which have been obtained by respective ones of k number of correlators (k is an integer such that 1<k≤j where j is an integer such that 1<j<n−2) including a jth correlator among first through jth correlators of said correlation circuit, so as to generate a first addition value;
    a second adder configured to add r number of correlation values which have been obtained by respective ones of r number of correlators (r is an integer such that k<r≤p where p is an integer such that j<p≤n) including a pth correlator among first through pth correlators of said correlation circuit, so as to generate a second addition value; and
    a subtractor configured to subtract said first addition value from said second addition value so as to generate a subtraction value; and
    wherein said synchronization detection unit compares said subtraction value with a threshold value, so as to generate said synchronization detection signal according to a comparison result.

2. The signal detection circuit according to claim 1, wherein said k number of correlators are successively connected together, and said r number of correlators are successively connected together.

3. The signal detection circuit according to claim 1, wherein said r number of correlators include a top correlator that is located after said jth correlator.

4. The signal detection circuit according to claim 1, wherein said k number of correlators are configured from first through kth correlators, and said r number of correlators are configured from (n−r+1)th through nth correlators.

5. The signal detection circuit according to claim 1, wherein said correlation circuit includes at least one correlator that is located after said jth correlator and does not belong to any of said k number of correlators and said r number of correlators.

6. The signal detection circuit according to claim 1, wherein said first adder adds correlation values of successive 2 s number of correlators together (s is a natural number) as said k number of correlation values, and said second adder adds correlation values of successive 2 t number of correlators together (t is a natural number such that t>s) as said r number of correlation values.

7. The signal detection circuit according to claim 1, wherein the r number of correlation values to be added by said second adder is greater, by two or more, than the k number of correlation values to be added by said first adder.

8. A signal detection method for a signal detection circuit including receiving a signal including data and a spreading sequence, and acquiring said data from the received signal on based on the spreading sequence, the signal detection method comprising the steps of:

obtaining, as first through nth correlation values (n is an integer equal to three or greater), a correlation value between a reference spreading sequence and said spreading sequence included in the received signal;

obtaining a correlation value while shifting said received signal depending on a chip rate period of said spreading sequence;

adding k number of correlation values (k is an integer such that $1<k\leq j$ where j is an integer such that $1<j<n-2$) including a jth correlation value among first through jth correlation values, so as to generate a first addition value, adding r number of correlation values (r is an integer such that $k<r\leq p$ where p is an integer such that $j<p\leq n$) including a pth correlation value among first through pth correlation values, so as to generate a second addition value, subtracting said first addition value from said second addition value so as to generate a subtraction value; and comparing said subtraction value with a threshold value, so as to generate a synchronization detection signal according to a comparison result.

9. The signal detection method according to claim 8, wherein said first addition value is acquired by adding together (j−k+1)th through jth correlation values that are correlation values for successive k bits, and said second addition value is acquired by adding together (p−r+1)th through pth correlation values that are correlation values for successive r bits.

10. The signal detection method according to claim 8, wherein the r number of correlation values include a top correlation value that corresponds to a lower bit of said jth correlation value.

11. The signal detection method according to claim 8, wherein said k number of correlation values are configured from first through kth correlation values, and said r correlation number of values are configured from (n−r+1)th through nth correlation values.

12. The signal detection method according to claim 8, wherein said first through nth correlation values include at least one correlation value that belongs to neither said k number of correlation values nor said r correlation values.

13. The signal detection method according to claim 8, wherein said first addition value is acquired by adding correlation values for successive 2 s bits together (s is a natural number) as said k number of correlation values, and said second addition value is acquired by adding correlation values for successive 2 t bits together (t is a natural number such that t>s) as said r number of correlation values.

14. The signal detection method according to claim 8, wherein the r number of correlation values to be added together into said second addition value is greater, by two or more, than the k number of correlation values to be added into said first addition value.

* * * * *